Jan. 9, 1934.  W. H. BAILEY  1,942,793
APPARATUS TO CONTROL THE FLOW OF FLUIDS THROUGH CONDUITS
Filed Oct. 5, 1931  2 Sheets-Sheet 1
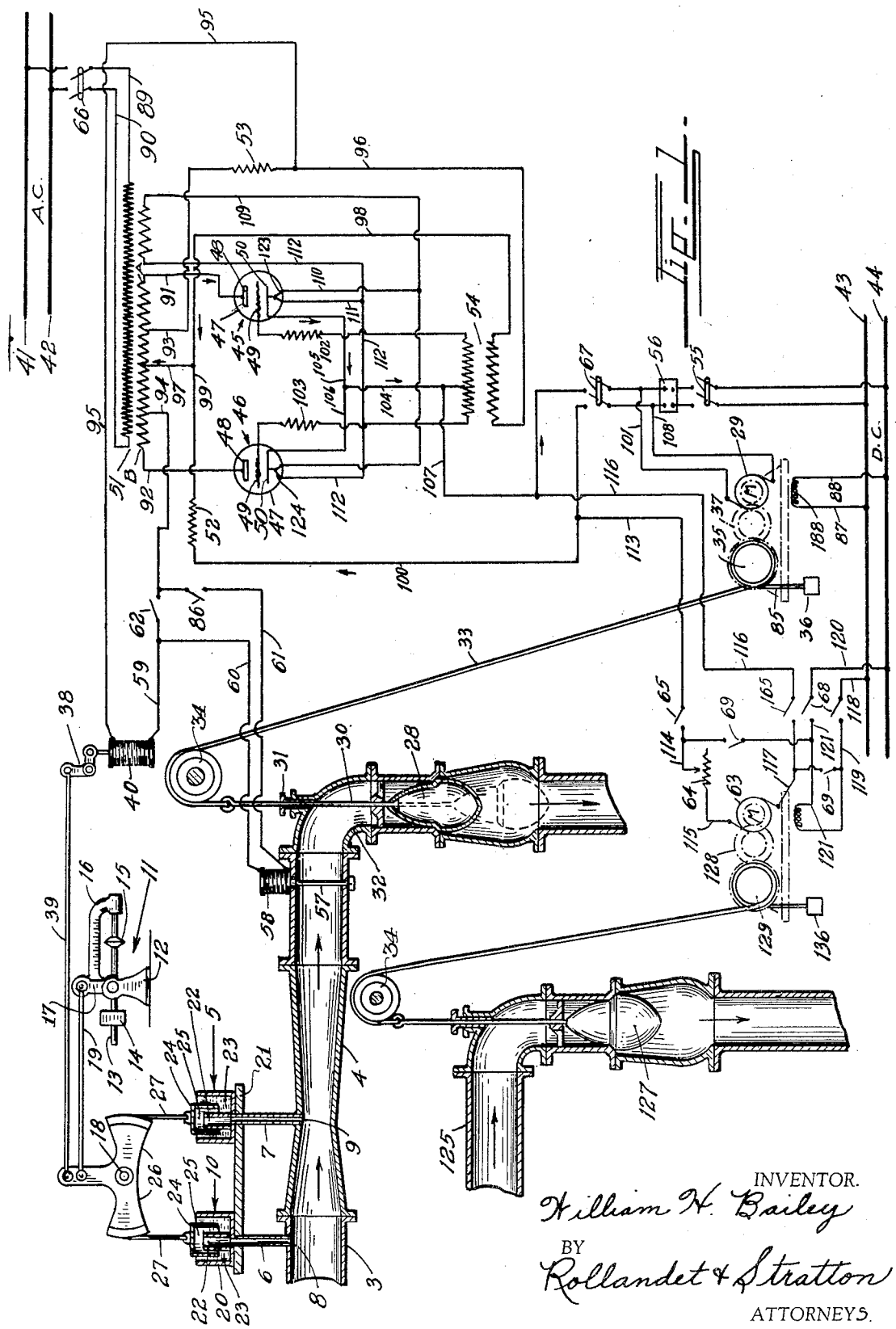
INVENTOR.
William H. Bailey
BY
Rollandet & Stratton
ATTORNEYS.

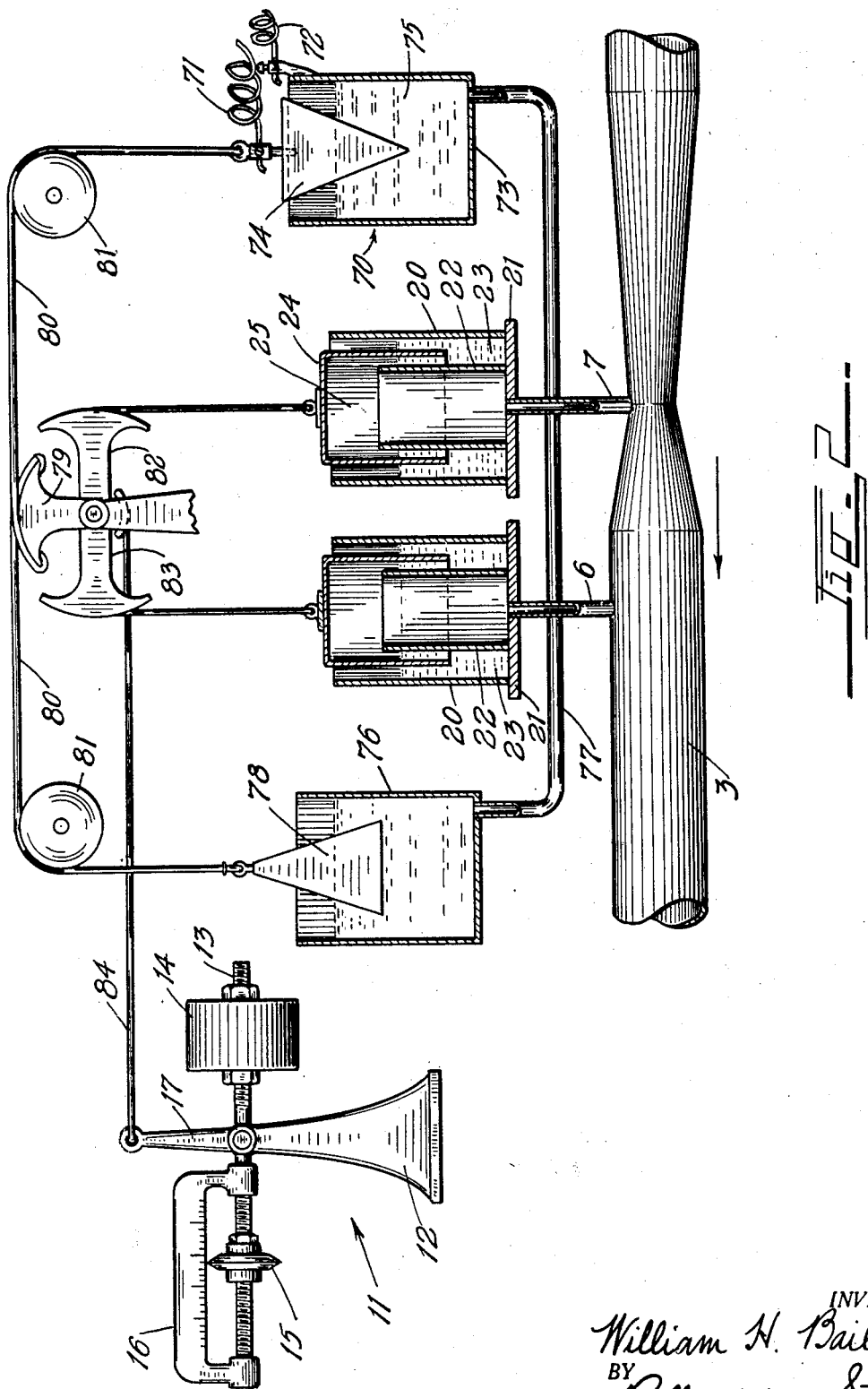

Patented Jan. 9, 1934

1,942,793

UNITED STATES PATENT OFFICE 1,942,793

APPARATUS TO CONTROL THE FLOW OF FLUIDS THROUGH CONDUITS

William H. Bailey, Pueblo, Colo., assignor to The Colorado Fuel and Iron Company, Denver, Colo.

Application October 5, 1931. Serial No. 567,114

2 Claims. (Cl. 48—180)

My invention relates to apparatus for automatically controlling the flow of gases or liquids by their velocity through a conduit.

An object of the invention is to employ the pressure differential, such as obtained in a Venturi tube, or other equivalent means, to control the velocity of the fluid (gas or liquid) through the conduit, particularly adaptable for controlling air and gas supplies for combustion purposes, as well as controlling variable supplies of gases or liquids of various types for many purposes.

Another object is to convert such differential pressure into energy, to carry out the foregoing functions.

Very slight differential in pressures must be utilized to operate control means requiring a relatively large amount of energy. To this end, I employ a motor for operating a valve that controls the passage of fluid through the conduit. The electrical current flowing to the armature of the motor is controlled by a manometer, or equivalent means, which is in turn sensitive to said differential pressure.

Other objects reside in details of construction, and in novel combinations and arrangements of parts, which will appear in the course of the following description.

In the drawing, like reference characters designate similar parts in the several views.

Figure 1 is a longitudinal sectional view of apparatus designed to carry out the foregoing objects, showing the electrical elements in diagrammatic form.

Figure 2 is an enlarged, longitudinal sectional view of a modified arrangement of parts.

Referring more in detail to the drawing, the reference characters 3 and 125 generally designate conduits adapted to convey fluids. The flows are in the direction of the arrows. A Venturi tube 4 is disposed in the conduit 3. Differential manometers comprised in the invention, generally indicated by the numbers 5 and 10, connect with the conduit 3 by small pipes 6 and 7. The pipe 6 connects with the conduit at a point 8 above the Venturi tube, and the pipe 7 connects at 9, the point of smallest diameter of the Venturi tube.

A fluid passing through the conduit 3 changes velocity between the points 8 and 9 approximately proportionate to a change in static head. The pressure at 8 is approximately the static pressure at that point, while the pressure at 9 is approximately the same as the static at 8 less the difference in velocity head at the two points, due to increasing the velocity at 9. This difference is constant irrespective of the static head, for constant volumes.

To set the balance between the manometers for a given velocity, I provide counterbalancing means 11 comprising a standard 12 for supporting a balance-beam 13 that carries adjusting weights 14 and 15 at either side of the fulcrum for the beam. A graduated scale 16 is disposed adjacent the weight 15 to measure adjustments thereof. An arm 17, movable with the beam 13, is connected with a rocking member 18 by a rod 19.

Each manometer consists of an upright cylinder 20 mounted on a base plate 21, or on different base plates, as in Figure 2. Concentric with the cylinder 20 is a smaller cylinder 22, also on the base plate and which surrounds the opening of the pipe 6 or 7, a liquid body 23 being disposed between the cylinders. An inverted cup 24 is suspended between the cylinders, which provides an air-tight enclosure 25 above the level of the fluid 23. This enclosure is connected with the interior of the conduit 3 by pipe 7 or 6 (depending upon whether manometer 5 or 10 is referred to).

The inverted cups 24 are connected to arms 26 of the rocking member 18 by rods 27. Thus relative movement of the cups is communicated to said member. If there is a change in the velocity of fluid in the conduit 3, it is evident that the manometers will be thrown out of balance with each other. The weights 14 and/or 15 are then adjusted to bring the manometers back into balance. The counterbalancing means 11, therefore, is a means for adjusting the manometers relative to the velocity of fluid in the conduit 3.

A valve 28 for controlling the flow of material through the conduit 3 is of a stream-line, needle type. Other types may, of course, be used. The type shown is preferred since it creates less turbulence in the fluid stream.

A motor 29 is utilized to operate the valve 28. The valve has a stem 30 passing through a stuffing box 31 in an elbow 32 in the conduit 3. One end of a cable 33, which passes over a sheave 34, is fastened to the valve stem 30. The other end of the cable is wound on a drum 35, which supports a counter weight 36 at the end, preferably, of another cable 85. Reduction gearing 37 connects the motor with the drum.

The counter-weight 36 opposes opening movement of the valve. The motor must resist movement of the counter-weight in approximately the exact amount required to maintain the valve in its desired position, to accomplish the purpose in mind; and the motor must function to release the counter-weight in order to close the valve when it is desired.

To control the circuit for the motor, the manometer rocker arm 18 is connected with a bell crank 38 by a connecting rod 39. The bell crank in turn operates a solenoid 40, having a variable reactance or other suitable electrical means.

Bus lines of alternating current are indicated at 41 and 42, and bus lines of direct current are shown at 43 and 44.

Three element tubes, shown at 45 and 46, comprise an air-tight casing 47 containing a small amount of inert gas for rectifying alternating electric current. Each tube contains an anode 48, and a hot cathode 50 on either side of a grid 49 having variable phase relationship. Each tube has a critical grid voltage, or ratio of negative grid voltage to positive anode voltage, below which no current will flow through the tube. Transformers indicated at 51 and 54, a smoothing coil at 52 and a fixed resistance at 53 are in the combined motor and tube circuit.

To provide means for gas of a constant thermal value passing through the conduit 3, the following hook-up is provided: A temperature-sensitive rod 57 preferably of copper, having a different coefficient of expansion than the material of the conduit, is disposed transversely of the conduit 3. The core of a solenoid 58 having a variable reactance is connected so as to be moved by lengthening of the sensitive rod 57. This affects the flow of current to the motor 29, by reason of being connected in series in a wire 59, leading from solenoid 40, by wires 60 and 61. Thus the solenoid 58 will change the character of the current passing through the circuit of the motor 29, proportionate to the increase or decrease in temperature above or below a predetermined value. To utilize the solenoid 58 and sensitive rod 57, a switch 62 in the line 59 is opened and a switch 86 is closed. If this thermal control is not desired, the switch 86 may be opened and switch 62 closed.

Thus should there be a rise in the temperature of the fluid passing through the conduit, the reactance of the tube circuit is affected, and the valve opened resulting in a correspondingly increased volume of gas passing through the conduit. In this manner, gas of a constant thermal value will pass through the conduit.

A second motor 63 is provided for controlling the flow of fluids through the conduit 125. This second motor has an adjustable resistor 64, in order to obtain any desired relationship of the torque of the second motor 63 with reference to the torque of the first motor 29. Thus when the present invention is used to feed air and gas to a combustion chamber, the second motor 63 regulates the air supply relative to variable quantities of gas regulated by the first motor 29. The circuit of the second motor 63 is similar to that of the motor 29, with the exception of the adjustable resistor 64. Manual switches 65, 165 may be opened if it is desired to exclude the second motor circuit from that of the first. By opening switches 65 and closing switches 68 and 69, the second motor can be connected with the direct current bus lines and not with the tube circuits.

A manual switch 66 controls the connection of the entire circuit with the alternating current bus lines. Switch 67 controls the connections between the motor armature and tube circuits.

The motor 29 is a direct current motor whose shunt field circuit 188 is excited from direct current bus lines 43 and 44, through wires 87 and 88, and whose armature is fed from the single phase alternating current bus lines 41 and 42 after full wave rectification in the three-element tube circuit as follows:

The primary of the transformer 51 is connected to the alternating current buses 41 and 42 through the switch 66 and wires 89 and 90. The full voltage taps of the secondary of the transformer 51 are connected to the anodes of the tubes 45 and 46 through wires 91 and 92, respectively. Part voltage taps of the secondary of the transformer 51, (one tap through wires 94 and 61, the solenoid 58, wires 60 and 59, the solenoid 40 and the wire 95, and the other tap through wire 93 and the resistor 53) are connected in parallel through wire 96 to one side of the primary of the grid transformer 54.

The neutral of the transformer 51 is connected to the other side of the primary of grid transformer 54 through wires 97 and 98. A tap from wire 97 is connected to the negative lead of the motor 29 through wire 99, the smoothing coil 52, wire 100, the switch 67, and wire 101. The full voltage taps of the secondary of grid transformer 54 are connected to the grids of tubes 45 and 46 through fixed resistances 102 and 103, respectively. Since no two tubes perform exactly alike, the resistances are valuable in balancing one grid against the other. The neutral of the transformer 54 is connected to filaments 50 of the tubes 45 and 46 through wires 104 and 105, and 104 and 106, respectively, and to the positive lead of motor 29 through wires 104 and 107, switch 67, and wire 108. Filament heaters 123 and 124 in the tubes 45 and 46 respectively are connected to an auxiliary winding in the transformer 51 through wires 109, 110, 111, and 112.

The second motor 63 may be fed from same or from another, similar tube circuit, to wit, the armature positive lead through wire 113, switch 65 and wire 114, the adjustable resistor 64, and wire 115, and the negative through wire 116, switch 165, and wire 117, while the field circuit is fed from the direct current buses through wires 118, 119, 120, and 121, and switch 68.

In case of failure of the alternating current supply or for manual operation, the motors may be operated from the direct current supply by opening switches 65, 165 and 67 and closing switches 55 and 69.

To begin operation, the switch 66 is closed, so that the filaments may be heated, and then the switch 67 is closed. With the grid voltage in phase with the anode voltage and less negative than the critical voltage of the tube, due to the position of the cores in the variable reactance solenoids 40 and 58, and with point "A" positive, current will flow from the anode in the tube 45 to the cathode, thence to the motor and back to the transformer, as indicated by the arrows for one-half cycle, while tube 46 is idle because point "B" is negative. In the next half cycle point "B" is positive and current flows through the tube 46 while the tube 45 is idle.

By changing the phase relation of grid to anode voltage due to movement of the cores in the solenoids 40 and 58, current may be started at any point in the positive half cycle and when started will flow to the end of that half cycle, thus affording a means of controlling the average time of electrical current flow to the armature of the motor and consequently the average torque of the motor.

It is to be understood that the tubes allow current to flow through them for only a fixed time during each cycle for any fixed phase relationship between the anode and the grid. Thus the grid only controls the starting period of the flow during each cycle.

The second motor 63 is employed to regulate the flow of liquids through the conduit 125. As suggested where the present invention is used for feeding air and gas to a combustion chamber, the conduit 3 is preferably used to supply gas and the conduit 125 for air, since the supply of fluid passing through the conduit 125 is automatically regulated relative to the supply in conduit 3, by the electric system described.

The ratio of the velocity of fluids through the two conduits may be varied by changing the relative torques of the motors by adjusting the resistor 64.

It will be noticed that no Venturi tube, manometers, or other apparatus utilized for the conduit 3 are necessary for the conduit 125, since the second motor is controlled by and relative to the first motor and the circuits described.

Figure 2 shows a schematic arrangement of control devices for volumetric control means, especially adapted for use with a motor requiring a small amount of power.

A rheostat is indicated generally at 70. The rheostat comprises a tank 73 connected in an electric circuit by wire 72. A weight 74 suspended in a body of liquid 75 in the tank is also connected in the circuit by a wire 71. Means for counterbalancing the rheostat comprise a tank 76 connected with tank 73 by a pipe 77, so that the liquid body 75 may flow from one tank to the other. A counter-balance weight 78 is suspended in the liquid in tank 76.

A rocker 79 is connected with the suspended weights by cords 80, or the like, passed over pulleys 81. Arms 82 and 83 of the rocker 79 suspend cups 24 of manometers similar to those heretofore described. The conduit 3 and connecting pipes, 6 and 7, have been described. The conduit 3 in Figure 2, is pointed in an opposite direction to the direction shown in Figure 1. The counterbalancing means 11 is also used in the arrangement shown in Figure 2. A rod 84 connects such means with the rocker.

The operation of the invention as shown in Figure 1 of the drawing will now be outlined. The operation will be described in connection with the use of the invention for controlling the relative quantities of gas and air fed into a combustion chamber. The quantity of air supplied is proportionate to the amount of gas, although the proportions can be changed, as will be hereinafter described.

The supply of gas is conveyed through the conduit 3 to a combustion chamber (not shown). The Venturi tube 4 is of value in discovering and measuring changes in the velocity, and hence of the volume, of gas traveling through said conduit. Where the velocity of the gas in the conduit 3 is increased, the differential between the points 8 and 9 is more marked. The same is true when the volume is increased, for the speed past the point 9 is thereby increased.

This increase in velocity at the point 9 in the conduit 3 disturbs the balance of the manometers 5 and 10, which are in balance for a given velocity. By means of the rocker 18 and connecting rod 39, this disturbance between the manometers is communicated to the core of the variable reactance solenoid 40. Movement of this core affects or changes the amount of current traveling through the circuit including such a solenoid, as is well known in the art.

Details of the circuits will not be gone into again, but only the general operation of same. The three-element tubes 45 and 46 do not allow current to travel through same unless the phase relationship of the grid to the anode voltage is altered. This change in the phase relationship is effected by movement of the core of the solenoid 40, as described. When this change is effected, the motor 29 is operated.

When the flow of gas through the conduit 3 is constant, the motor 29 is energized just enough to resist movement of the counter-weight 36. When the flow increases, the motor 29 is de-energized partially or wholly, permitting the counter-weight 36 to descend, thus moving the valve 28 toward a closed position. When the flow decreases, the motor 29 is energized to a greater degree and the counter-weight is raised, allowing the valve 28 to open by gravity. By this means, the volume of gas traveling through the conduit 3 is controlled, despite an irregular supply.

By means of the electrical circuits hereinbefore described, the flow of air through the conduit 125 is similarly controlled. The slightly energized motor 63 normally holds the drum 129 and hence the valve 127 steady. When the current to the motor 63 is increased by a decrease in the velocity of the fluid in the venturi 4, said motor operates to open the valve 127. When the current is decreased, by an increase in the velocity of said fluid, the motor 63 is wholly or partially de-energized, allowing the counter-weight 136 to move the valve 127 toward a closed position.

Where it is desired to increase or decrease the proportion of air relative to the amount of gas, the resistor 64 is accordingly adjusted.

The explanation of the operation just given contemplates having the switch 62 closed and the switch 86 open. When it is desired to control the flow of the gas in the conduit 3 according to the thermal valve said positions of these switches are reversed.

The rod 57 is temperature sensitive and its movements are communicated to the core of the variable reactance solenoid 58. Thus the temperature of the gas in the conduit controls the movements of the valve 28. When the temperature of the gas rises, the valve 28 is opened to greater degree, thus relieving the pressure and thereby lowering the temperature. When the temperature falls, the valve 28 is moved nearer a closed position, thus increasing the pressure and thereby raising the temperature. Thus gas of only a constant thermal value passes through the conduit free at any given time.

The operation of the construction shown in Figure 2 is similar to the manometers shown in Figure 1. A change in the relative pressures in the pipes 6 and 7 in Figure 2, is communicated to the rocker 79 by the manometers 20. When the velocity relatively increases at the lower end of the pipe 7, as shown in Figure 2, the partial vacuum in the pipe 7 and in the space 25 in the right hand manometer, as shown, is increased, thus causing the arm 82 to descend and the tapered weight 74 to dip farther into the fluid 75, thus increasing the amount of current, traveling to the motor, which, in a hook-up, as shown in Figure 1, opens the valve for the conduit 3. When the velocity is decreased in the conduit 3 in Figure 2, the suction in the pipe 7 is relatively less, allowing the arm 83 to descend, through the intermediary of the manometers. This movement of the arms 83 partially withdraws the tapered weight 74 from the liquid 75, thus reducing the amount of current traveling through the wires 71 and 72, because of the smaller contact surface between the weight and the liquid.

What I claim and desire to secure by Letters Patent is:

1. A fluid supply system, comprising a conduit for gas, a conduit for air, valves for the conduits, a Venturi tube in the gas conduit, a differential manometer connected to be operated by a change in the velocity of the gas through said tube, an electric circuit connected to be operated by the manometer, and electric means in the circuit adapted to control the valves in the conduits.

2. A fluid supply system, comprising a conduit for gas, a conduit for air, valves for the conduits, a Venturi tube in the gas conduit, a differential manometer connected to said tube at wide and narrow points thereof, the manometer being adapted to be balanced for a predetermined velocity of gas through the tube, and normally inactive electric means for operating said valves, said means being connected to be energized when the balance of the manometer is affected by a change of velocity of the gas through the tube.

WILLIAM H. BAILEY.